United States Patent [19]

Cecchin et al.

[11] 3,733,562

[45] May 15, 1973

[54] SIGNAL PROCESSING CIRCUIT FOR A COLOR TELEVISION RECEIVER

[76] Inventors: Gildo Cecchin, 8744 W. North Ter., Niles, Ill. 62522; Francis H. Hilbert, 8741 Lyndale, River Grove, Ill. 60171

[22] Filed: Mar. 4, 1971

[21] Appl. No.: 120,969

Related U.S. Application Data

[62] Division of Ser. No. 880,320, Nov. 26, 1969.

[52] U.S. Cl. ..........332/9 T, 178/5.4 SD, 178/5.4 AC, 330/30 D, 332/43 B

[51] Int. Cl. ..............................................H03c 1/54

[58] Field of Search...................332/9, 9 T, 14, 43 B, 332/43; 178/5.4 SD, 5.4 AC; 330/30 D, 69

[56] References Cited

UNITED STATES PATENTS

| | | | |
|---|---|---|---|
| 3,550,040 | 12/1970 | Sinusas | 330/30 D X |
| 3,241,078 | 3/1966 | Jones | 330/30 D X |
| 3,260,952 | 7/1966 | Kaye et al. | 330/30 D UX |
| 3,170,125 | 2/1965 | Thompson | 332/9 T X |
| 3,506,776 | 4/1970 | Rennick | 178/5.4 SD |

*Primary Examiner*—Alfred L. Brody
*Attorney*—Mueller, Aichele & Rauner

[57] ABSTRACT

A color television receiver uses an integrated circuit to provide the subcarrier reference signals and ACC control voltage for the receiver. The circuit includes a first differential amplifier, unbalanced at the burst signal frequency, operated as the color reference oscillator to provide first and second differently phased output signals which are applied to a pair of differential steering gates. A phase-shift hue control of the color reference signal is obtained by adding selected outputs of the pair of differential steering gates. In addition, a differential amplifier is operated as a diodeless detector for deriving an ACC voltage from the oscillator output when burst signals are applied to the input of the oscillator.

4 Claims, 1 Drawing Figure

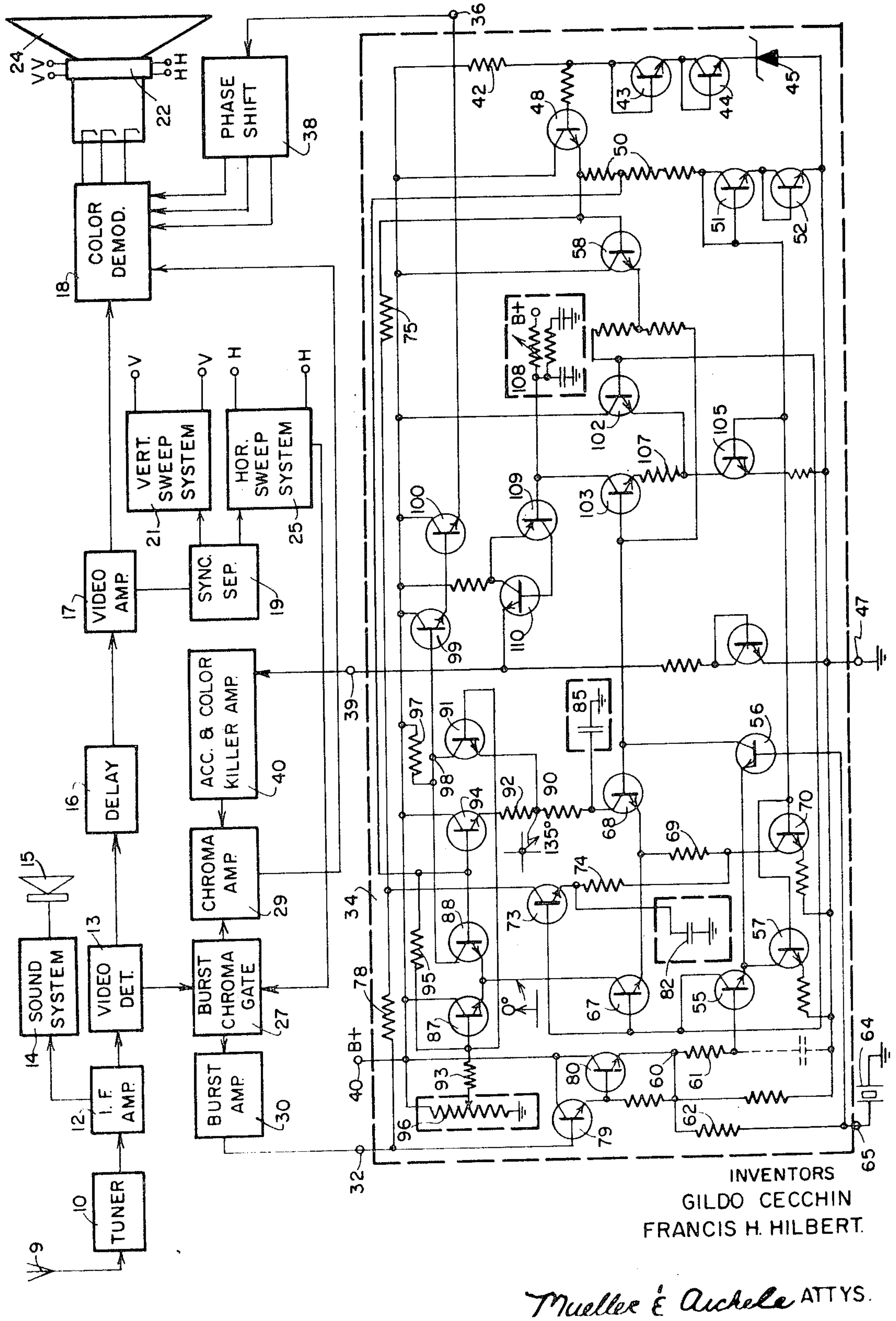
INVENTORS
GILDO CECCHIN
FRANCIS H. HILBERT
Mueller & Aichele ATTYS.

SIGNAL PROCESSING CIRCUIT FOR A COLOR TELEVISION RECEIVER

RELATED APPLICATION

This application is a division of copending application, Ser. No. 880,320 filed Nov. 26, 1969.

BACKGROUND OF THE INVENTION

The standard NTSC color television signal is comprised of a color information signal component, phase and amplitude modulated on a color subcarrier to represent hue and saturation, respectively, a brightness signal component; a burst signal component, synchronized with the color information subcarrier; and synchronizing signal components.

In the color television receiver, separate channels to the demodulator are provided for the brightness and color components. The burst signal is separated from the remainder of the composite signal to provide a reference signal used for controlling the synchronous demodulation of the modulated color component. Since the saturation of the colors in the image produced by the receiver is dependent upon the ratio of the amplitudes of the color subcarrier waves and the brightness signal components, it has been found desirable to utilize a separate or selective gain control of the color processing channel in addition to any automatic gain control similar to that which is employed in a conventional black and white television receiver.

Since the amplitude of the burst component bears a direct relationship with the amplitude of the color information component of the composite signal and the burst signal component is present only when color information is being transmitted and has an amplitude which bears a direct relationship with the amplitude of the color information component of the composite signal, a selective automatic gain control for the chrominance or color channel often is derived from the presence of a predetermined amplitude of the burst component. This selective gain control function for the color or chroma processing channel is designated as the "automatic chroma control" (ACC) function.

In order to adjust the hue of the image viewed on the screen of the cathode ray tube, it is a common practice to provide for means for shifting the relative phases of the incoming color subcarrier and the subcarrier reference signal which is utilized to demodulate the color subcarrier. By adjusting the relative phases of these signals, it is possible for the viewer of a television receiver to adjust the hues of the reproduced images to suit his individual preferences.

Integrated circuit techniques permit a substantial reduction in the size of the different signal processing circuits present in a color television receiver, and it is desirable to utilize integrated circuit techniques for the reference oscillator and hue control portions of the receiver, if possible. Since integrated circuit techniques readily lend themselves to the efficient and economical use of matched differential amplifier circuitry, it is desirable to employ differential amplifier techniques in the color oscillator and the hue control portions of the reference signal producing circuits of a color television receiver. In addition, it is desirable to provide an efficient means of deriving an ACC voltage from an integrated circuit reference oscillator.

SUMMARY OF THE INVENTION

Accordingly it is an object of this invention or provide an improved signal processing circuit for a color television receiver.

It is an additional object of this invention to provide an improved phase-shift circuit for shifting the phase of an output signal with respect to an input signal.

It is a further object of this invention to provide a frequency selective differential amplifier circuit.

It is another object of this invention to provide a signal level responsive differential detector circuit for providing a DC output signal in response to AC input signals exceeding a predetermined level.

In accordance with a preferred embodiment of this invention, the reference oscillator circuit of a color television receiver includes a frequency selective, differential amplifier having feedback signals and burst signals applied in common to both inputs of the amplifier, which is balanced to all input signals except those at the desired frequency of operation by placing a series-resonant circuit at the desired frequency between the one of the inputs and a point of reference potential. The two opposite-phase outputs of the differential amplifier are adjusted in relative phase and applied as input signals to second and third differential circuits, operated as differential current modulators under the control of DC bias potentials. One of the outputs of the second differential current modulator is combined with or added to an output of the third differential current modulator which is varied in substantially the opposite sense to produce the desired phase-shifted reference oscillator output signal, and the amount of phase shift is effected by the control potentials used for steering the oscillator output signals through the second and third differential current modulator elements.

An ACC voltage is derived from the differential amplifier oscillator output which is applied to the amplifier elements of an ACC differential amplifier. This ACC differential amplifier is unbalanced; so that for a signal level below a predetermined amount, one of the amplifier elements of the ACC differential amplifier is substantially nonconductive, and conducts heavily when the signal level exceeds the predetermined amount, occurring only when burst components of a predetermined magnitude are used to drive the differential amplifier oscillator. The heavy conduction of this further amplifier element in the ACC differential amplifier is used to produce a DC control voltage utilized as the ACC and color killer output voltage of the circuit.

BRIEF DESCRIPTION OF THE DRAWING

The single FIGURE of the drawing is a schematic diagram, partially in block form, of a color television receiver employing a burst signal processing circuit in accordance with a preferred embodiment of the invention.

DETAILED DESCRIPTION

Referring now to the drawing, there is shown a color television receiver including an antenna 9, supplying input signals to a tuner 10 which receives and converts the incoming television signals to an intermediate frequency signal. The tuner 10 may include, for example, RF stages of the receiver as well as a first detector or mixer and an associated local oscillator. The output intermediate frequency developed by the tuner 10 is coupled through an intermediate frequency amplifier 12 to a video detector 13. The output of the intermediate frequency amplifier 12 also is applied to a sound system 14, which supplies amplified audio signals to a loud speaker 15. Brightness signal components in the detected composite video signal are delayed in a delay circuit 16, for purposes well known to those skilled in the art, and are applied to a video amplifier 17, the output of which is supplied to a color demodulator circuit 18.

The composite signal provided by the video amplifier 17 has video information components with a blanking interval reccurring at the horizontal rate of 15,734 Hz. A horizontal synchronizing pulse appears at the beginning of each blanking interval, immediately followed by a burst signal component. A vertical synchronizing pulse also appears in the composite video signal at a 60 Hz rate and is separated from the remainder of the composite signal in a synchronizing pulse separator circuit 19. The separated vertical synchronizing pulses then are applied to a vertical sweep system 21 which develops a vertical sawtooth sweep signal V—V in vertical deflection windings placed on a deflection yoke 22 on the neck of a cathode ray tube 24 for vertically deflecting the electron beams in the cathode ray tube 24.

The horizontal synchronizing pulses also are separated from the remainder of the composite signal in the pulse separator circuit 19 and are applied to a horizontal sweep system 25 which develops horizontal sweep signals H—H in horizontal deflection windings on the deflection yoke 22 for horizontally deflecting the electron beams in the cathode ray tube 24.

In addition, the composite signal obtained from the video detector 13 also is supplied to a burst-chroma gate 27, which causes the color subcarrier components to be applied to a chroma amplifier 29, the output of which then is supplied to the color demodulator 18 for demodulation thereby. The gate 27 is controlled by flyback pulses obtained from the horizontal sweep system 25; and each time that a horizontal flyback pulse is applied to the burst-chroma gate 27, the input signals obtained from the video detector 13 are diverted to a burst amplifier 30. Since the flyback pulses occur during the time that the burst components are present, the output of the burst amplifier 30 is in the form of amplified alternating current signals at the burst frequency only. These signals are applied to a terminal 32 of an integrated signal processing circuit 34, including the reference oscillator, hue control, and ACC voltage generating portions of the color television receiver. An output bonding pad 36 is supplied with the subcarrier reference signal at the desired phase relative to the burst component, with this reference signal being applied to a phase-shifting circuit 38 to produce the three phases of color reference signals to the color demodulator circuit 18 which directly produces the red, blue, and green color signals needed to drive the cathodes of the cathode ray tube 24.

The output signal level of the reference oscillator formed as part of the integrated circuit 34 is proportional to the amplitude of the burst signal components provided on the input terminal 32; and is used to obtain a DC control signal which is applied from an output terminal 39 to an automatic chroma control (ACC) and color killer amplifier circuit 40. The circuit 40 provides a DC control voltage or potential used to control the gain and color killing of the chroma amplifier circuit 29 in a known manner.

In accordance with the preferred embodiment of the invention shown in the drawing, the reference oscillator, hue control circuit, and ACC control potential generating circuit all are formed as a part of a signal integrated circuit 34, formed on an independent chip or as part of a larger integrated circuit chip including other portions of the signal processing circuitry of the television receiver, such as the burst-chroma gate, chroma amplifier, and burst amplifier portions, if desired.

Referring now to the signal processing circuit 34 in detail, a positive DC operating potential is applied to the integrated circuit chip 34 on a bonding pad 40 and through a resistor 42, a pair of series-connected transistor diodes 43 and 44, and a Zener diode 45 to a ground bonding pad 47 for establishing a stabilized DC operating potential. This stabilized DC operating potential at the junction of the resistor 42 and the transistor diode 43 is applied to an emitter-follower transistor 48, the emitter of which is coupled through a voltage divider consisting of series resistors 50 and an additional pair of transistor diodes 51 and 52, with the emitter of the transistor diode 52 being coupled to the ground bonding pad 47. The DC operating potentials at various levels necessary to operate the remainder of the circuit 34 are obtained from the voltage dividers 42 to 45 and 48, 50 to 52.

The basic element for producing the subcarrier signal regeneration is an oscillator formed by a differential amplifier including a pair of NPN transistors 55 and 56 the emitters of which are coupled in common to a current source provided by an NPN transistor 57, the base of which is controlled by a stabilized DC potential, derived from the previously described DC voltage dividers, and the emitter of which is coupled through a resistor to the ground bonding pad 47. Operating potential for the collectors of the transistors 55 and 56 is provided by an emitter-follower 58 which is cascaded with the emitter-follower 48. Feedback and synchronizing input signals are applied to the bases of the transistors 55 and 56 at a terminal 60 which is connected to the base of the transistor 55 through a resistor 61 and which is connected to the base of the transistor 56 through a resistor 62. The impedance values of the resistors 61 and 62 are the same, and the transistors 55 and 56 are matched; so that for input signals which are applied in a common phase and amplitude to both of the inputs, the differential amplifier 55, 56 provides excellent common mode rejection (that is, provides no gain to signals in common phase and amplitude at the bases of both of the transistors 55 and 56).

In order to cause the differential amplifier 55 and 56 to be frequency selective, a crystal 64 is coupled between ground and a bonding pad 65 connected directly to the base of the transistor 56 at the junction of the resistor 62 and the base of the transistor 56. The crystal 64 operates as a series-resonant circuit at a frequency of the burst signal components of the incoming signal applied to the bonding pad 32. Thus, for signals at the terminal 60 at the burst frequency the crystal 64 resonates, causing the differential amplifier 55, 56 to be placed out of balance at the frequency of the burst signal components, thereby resulting in amplified output signals at the burst signal frequency and at opposite phases on the collectors of the transistors 55 and 56. The introduction of the series-resonant crystal 64 also tends to unbalanced the circuit to other frequencies due to stray capacitances and the crystal holder capacitance. As a result, undesired frequency selection may result to overcome this, the geometry of the resistor 61 may be adjusted so that its area is substantially greater than the area of the resistor 62, but the length-to-width ratios of both resistors 61 and 62 are the same to cause the impedances to be of the same value. The added area of the resistor 61, however, increases the substrate capacitance (indicated in dotted lines) to compensate for the added, unwanted capacitances caused by the addition of the crystal 64. Compensation also could be provided by adding a capacitor of the correct value between the base of the transistor 55 and the ground bonding pad 47.

The output signals on the collector of the transistor 55 and 56 are applied to the bases of an additional pair of NPN transistors 67 and 68, respectively, connected as a differential amplifier with the emitters of the transistors 67 and 68 being coupled through an impedance 69 to the collector of an NPN current source transistor 70. The circuit is operated so that the transistors 67 and 68 are driven into limiting, that is, these transistors are alternately driven between saturation and cut-off; so that in order to derive a constant amplitude feedback signal for the oscillator circuit without interfering with the drive of the transistor 67 and 68, an additional NPN feedback transistor 73 is provided. The emitter of the transistor 73 is coupled through a high impedance 74 to the collector of the constant current source 70, with the relative value of the impedance 74 being substantially greater than the value of the impedance 69. The base of the transistor 73 is coupled to the collector of the transistor 55 and is driven in accordance with the same driving signals used to control the operation of the transistor 67. The high impedance coupled to the emitter of the transistor 73, however, causes the feedback amplifier 73 to be highly degenerated; so that the feedback signal is taken from the collector of the transistor 55 without significantly affecting the operation of the differential amplifier transistors 67, 68.

DC operating potential for the collector of the transistor 73 is obtained from the emitter of the emitter-follower 48 through a coupling resistor 75. The signals present on the collector of the transistor 73 are applied through a further coupling resistor 78 to the base of a first one of a cascaded pair of emitter-follower NPN transistors 79 and 80, with the emitter of the transistor 80 being coupled as one of the input signals to the terminal 60. As a result, once the differential amplifier oscillator circuit 55, 56 has been shocked into oscillation by some means, the system continues to oscillate at the resonant frequency determined by the series resonant crystal 64 at an output signal level on the collectors of the transistors 55 and 56 which is determined by the biasing potentials present in the circuit.

In order to compensate for the signal lags introduced by the different portions of the oscillator circuit, a phase shifting capacitor 82 is coupled between ground and the junction of the resistor 74 with the emitter of the transistor 73. This capacitor may be either internal to the integrated circuit 34 or external (as indicated by enclosing it in dotted lines in the drawing) to provide the desired amount of phase lead which is necessary in order to cause the feedback signal to be close to zero phase.

The transistors 67 and 68 provide regenerated subcarrier signals at their collectors which are approximately 180° out-of-phase and also act as current sources. In order to utilize this regenerated subcarrier, however, to control the hue of the image reproduced by a color television receiver, it is necessary to control the phase of the regenerated subcarrier with respect to the burst components. This is accomplished by using a capacitor 85 coupled between the collector of the transistor 68 and ground to introduce a predetermined lag in the signals appearing at the collector of the transistor 68.

As shown, this lag is selected to cause the signals from the collector of the transistor 68 to be at a phase of 135° relative to the phase of the signals on the collector of the transistor 67. Then the signals on the collector of the transistor 67 are applied to the common-coupled emitters of a differential current modulator, including a pair of NPN transistors 87 and 88. In a similar manner, the phase shifted signals appearing on the collector of the transistor 68 are applied through a coupling resistor 90 directly to the emitter of a first NPN transistor 91 and through an additional resistor 92 to the emitter of another NPN transistor 94, with the transistors 91 and 94 forming a differential current modulator circuit.

The differential current modulators 87, 88 and 91, 94 operate with the current modulation being accomplished by varying the DC bias potentials applied to the bases of the transistors. The transistors 88 and 94 are employed as the reference transistors and are provided with a stabilized DC potential from the voltage divider 50. In a similar manner, the bases of the transistors 87 and 91 are provided with a variable DC potential obtained through a resistor 93 from an external potentiometer 96. A portion of this variable DC potential also is cross-coupled to the bases of the transistors 88 and 94 through a coupling resistor 95 to compensate for power supply variations and variations with temperature of the value of resistance of the potentiometer 96. This cross-coupling network reduces effects of power supply and ambient temperature variations. The relative values of the potential obtained from the potentiometer 96 and the potential applied to the bases of the transistors 88 and 94 cause varying amounts of current to be steered through the two transistors 87, 88 and the transistors 91, 94 of the two phase-control differential current modulators. Operating potential for the differential current modulators 87, 88 and 91, 94 is obtained from the DC potential present on the bonding pad 40 and is applied through an isolating resistor 97 to the collectors of the transistors 91 and 88.

The collectors of the transistors 91 and 88 are coupled together at a terminal 98 to add the signals passed by these transistors, forming the phase-shifted subcarrier reference output signal, with variations in the potential of the potentiometer 96 serving to result in an output with a wide range of phase control (0°–135° approximately). For example, as the potential applied from the tap on the potentiometer 96 is increased with respect to the potential applied to the bases of the transistors 88 and 94, the transistors 87 and 91 are rendered relatively more conductive while the transistors 88 and 94 are rendered relatively less conductive, since the transistors 67 and 68 operate as constant current sources for the two differential current modulators. When this occurs, more of the signal applied to the transistor 91 of the differential current modulator 91, 94 is coupled to the common output terminal 98 and applied to the base of an input transistor 99 of a pair of NPN, cascaded, emitter-follower amplifier and isolating transistors 99 and 100, with the emitter of the transistor 100 being coupled to the bonding pad 36 forming the output reference signal from the integrated circuit 34. At the same time, a reduced signal is applied from the collector of the transistor 88 to the terminal 98.

As the DC control potential applied to the bases of the transistors 87 and 91 is reduced or made lower with respect to the potential applied to the bases of the transistors 88 and 94, the transistors 88 and 94 are rendered more conductive and the transistors 87 and 91 are rendered less conductive to their respective input signals; so that a greater proportion of the signal present on the collector of the transistor 67 is coupled to the base of the emitter-follower 99 than of the signal present on the collector of the transistor 68. The cross-coupling of the collectors of the transistors 88 and 91 results in vector addition of these differently phased signals to provide the desired phase shift for effecting the hue control of the circuit. The resistor 92 coupled to the emitter of the transistor 94 is used to compensate for amplitude variations which occur as a result of the changes in the DC level used to effect the desired phase shifting. The phase shift of the signal applied to the emitters of the transistors 91, 94 causes this signal to be attenuated with respect to the signal applied to the emitters of the transistors 87, 88; so that as the phase of the output signal from the collectors of the transistors 88 and 91 is varied by adjustment of the potentiometer 96, the amplitude also varies. The resistor 92 alters the balance of the signals applied to the transistors 91 and 94 in a manner to minimize these amplitude variations.

It should be noted that the basic technique which is employed may be used to provide leading or lagging phase shifts and also that the collectors of the transistors 87 and 94 could be cross-coupled to obtain an oppositely varying phase shift. In fact, both of these cross-coupled outputs could be utilized simultaneously to accomplish a greater range of phase shift, but a single output from each of the differential current modulators 87, 88 and 94, 91 may be used to effect sufficient range under normal conditions of operation.

When burst signals are present from the output of the burst amplifier 30 and are applied to the bonding pad 32, these signals are of sufficient amplitude to swamp-out or dominate the feedback signals are applied to this terminal from the collector of the feedback transistor 73. As a consequence, the operation of the oscillator 55, 56 is phase-locked to the burst signal components applied to the base of the double emitter-follower circuit 79, 80. Since these burst signals are of greater amplitude than the feedback signal applied in the absence of a burst, the signals appearing at the terminal 60 also are of greater amplitude in the presence of burst, and cause the transistors 55, 56 to be driven harder, resulting in a signal of greater magnitude on the collectors of these transistors.

In addition to driving the coupling transistors in the differential amplifier 67, 68, the collectors of the transistors 55, 56 are coupled to the bases of a further pair of NPN transistors 102, and 103, respectively, with the transistors 102, 103 forming a differential amplifier operated as a detector circuit. A constant current source for the differential amplifier 102, 103 is provided by an NPN transistor 105. The collector of the transistor 105 is connected directly to the emitter of the transistor 103 and is connected through a resistor 107 to the emitter of the transistor 103.

The value of the resistor 107 is chosen to be such that under normal operating conditions of the differential oscillator 55, 56 in the absence of burst signal components applied to the bonding pad 32, the oscillator output amplitude is such that the transistor 103 conducts little or no current, with the transistor 102 being continuously heavily conductive. As the oscillator amplitude increases, however, due to the presence of a burst drive signal from the burst amplifier 30, resulting in an increased amplitude in the signal present on the collectors of the transistors 55 and 56, the driving potential applied to the bases of the transistors 102 and 103 is increased to the point where the transistor 103 conducts heavily. As the transistor 103 conducts, a DC potential is developed on the collector of the transistor 103 by an ACC filter 108 located externally of the integrated circuit chip 34.

The potential present on the collector of the transistor 103 is directly proportional to the amplitude of the burst signal components applied to the terminal 32, and may be utilized for ACC and color killer applications. This potential is applied through a lateral PNP transistor 109 and an NPN emitter-follower transistor 110, with the signals appearing on the emitter of the transistor 110 being coupled to the terminal 39 which supplies the ACC and color killer signals to the amplifier circuit 40. Thus, the differential amplifier circuit 102, 103 operates as a direct-coupled rectifier system responsive to the amplitude of the input signals applied to it. It should be noted that this circuit could be made a full-wave circuit by providing a similar circuit oppositely phased, and combining the outputs of the two circuits.

We claim:

1. A phase-control circuit for shifting the phase of an output signal with respect to an input signal in response to a direct current control voltage including in combination:

means for providing input signals on first and second input terminals, said input signals having a predetermined phase difference less than 180°;

first differential current modulator means having first and second amplifier devices each having at least first, second, and third electrodes;

second differential current modulator means having third and fourth amplifier devices, each having at least first, second, and third electrodes;

means for coupling the first electrodes of the first and second amplifier devices with the signal present on one of the input terminals;

means for coupling the first electrodes of the third and fourth amplifier devices with the signals present on the other of the input terminals;

means for providing first and second DC control potentials;

means for applying the first DC control potential to the second electrodes of the first and fourth amplifier devices;

means for applying the second control potential to the second electrodes of the second and third amplifier devices;

means for supplying operating potential to the third electrodes of the first and third amplifier devices; and means for coupling the third electrodes of the second and fourth amplifier devices together to form an output, the phase of which varies relative to the phases of the signal applied to the first and second input terminals in accordance with the relative values of the first and second control potentials.

2. The combination according to claim 1 wherein the first and second differential current modulator means are formed as part of an integrated circuit and wherein the first, second, third and fourth amplifier devices are transistors, with the first, second, and third electrodes corresponding, respectively, to emitter, base, and collector electrodes, and further including means for varying the relative potentials of the first and second DC control potentials to thereby vary the phase of the output signal obtained from the intercoupled collectors of the second and fourth transistors, with respect to the phase of the signals present on the input terminals.

3. The combination according to claim 1 wherein the means for providing input signals includes an input differential amplifier means with fifth and sixth amplifier devices each having at least first, second and third electrodes, and phase shift means coupled with the third electrode of at least one of the fifth and sixth amplifier devices to shift the phase of signals appearing thereon by a predetermined amount, the output of the phase shift means comprising the first input terminal, the third electrode of the other of the fifth and sixth amplifier devices comprising the second input terminal, means for coupling the first electrodes of the fifth and sixth amplifier devices with a current source, and means for coupling a signal, a phase of which is to be shifted, with the second electrode of at least one of the fifth and sixth amplifier devices.

4. The combination according to claim 3 wherein the first and second differential current modulator means and the differential amplifier means are formed as part of an integrated circuit and wherein the first, second, third, fourth, fifth and sixth amplifier devices are transistors, with the first, second, and third electrodes thereof corresponding, respectively, to emitter, based, and collector electrodes; and the phase shift means includes capacitor means coupled from the collector of said at least one of the fifth and sixth amplifier devices to a point of reference potential and first resistance means coupled between the collector of said at least one of the fifth and sixth amplifier devices to the first input terminal; the means for coupling the first electrode of the first amplifier device comprising second resistance means connected between the emitter of the first transistor and the first input terminal, the emitter of the second transistor being coupled directly with the second input terminal.

* * * * *

UNITED STATES PATENT OFFICE
CERTIFICATE OF CORRECTION

Patent No. 3,733,562 Dated May 15, 1973

Inventor(s) Gildo Cecchin, et al.

It is certified that error appears in the above-identified patent and that said Letters Patent are hereby corrected as shown below:

On the cover sheet after item " [76] " and before item " [22] " insert the following:

-- [73] Assignee: Motorola, Inc., Franklin Park, Ill., a Corporation of Illinois --.

Signed and sealed this 26th day of February 1974.

(SEAL)
Attest:

EDWARD M.FLETCHER,JR.
Attesting Officer

C. MARSHALL DANN
Commissioner of Patents